United States Patent
Yu et al.

(10) Patent No.: US 6,907,195 B2
(45) Date of Patent: Jun. 14, 2005

(54) TERMINALS HAVING SUB-BAND SUBSTITUTE SIGNAL CONTROL IN OPTICAL COMMUNICATION SYSTEMS

(75) Inventors: Zhengchen Yu, Germantown, MD (US); William Shieh, Columbia, MD (US); Thomas R. Clark, Jr., Columbia, MD (US); Vladimir Petricevic, Columbia, MD (US)

(73) Assignee: Dorsal Networks, Inc., Columbia, MD (US)

( * ) Notice: Subject to any disclaimer, the term of this patent is extended or adjusted under 35 U.S.C. 154(b) by 599 days.

(21) Appl. No.: 09/939,784

(22) Filed: Aug. 28, 2001

(65) Prior Publication Data

US 2003/0048508 A1 Mar. 13, 2003

(51) Int. Cl.$^7$ ............................. G02F 1/00; H04J 14/02
(52) U.S. Cl. ............................. 398/5; 398/91; 398/94; 398/95
(58) Field of Search .............................. 398/48, 68, 82, 398/91, 94, 95

(56) References Cited

U.S. PATENT DOCUMENTS

| | | |
|---|---|---|
| 4,963,832 A | 10/1990 | Desurvire et al. |
| 4,971,417 A | 11/1990 | Krinsky et al. |
| 5,088,095 A | 2/1992 | Zirngibl |
| 5,117,196 A | 5/1992 | Epworth et al. |
| 5,223,705 A | 6/1993 | Aspell et al. |
| 5,239,607 A | 8/1993 | da Silva et al. |
| 5,268,786 A | 12/1993 | Matsushita et al. |
| 5,299,055 A | 3/1994 | Yoneyama |
| 5,455,704 A | 10/1995 | Mizuochi et al. |
| 5,506,724 A | 4/1996 | Shimizu et al. |
| 5,563,731 A | 10/1996 | Asahi |
| 5,570,227 A | 10/1996 | Nabeyama et al. |
| 5,764,404 A | 6/1998 | Yamane et al. |

(Continued)

FOREIGN PATENT DOCUMENTS

| | | |
|---|---|---|
| EP | 0651476 A1 | 10/1994 |
| EP | 0792035 A2 | 2/1997 |
| EP | 0829981 A2 | 9/1997 |
| EP | 0838913 A2 | 4/1998 |
| EP | 0881790 A1 | 5/1998 |
| EP | 0887953 A2 | 6/1998 |
| EP | 0910182 A2 | 4/1999 |
| JP | 10-242943 A | 3/1997 |
| JP | 10-256633 A | 3/1997 |
| JP | 10-247896 A | 3/1998 |
| JP | 10-262032 A | 12/1998 |
| WO | WO 00/72479 | 11/2000 |

OTHER PUBLICATIONS

Morten Ibsen et al., *8– and 16–Channel All–Fiber DFB Laser WDM Transmitters with Integrated Pump Redundancy*, IEEE Photonics Technology Letters, pp. 1114–1116, vol. II, No. 9, Sep. 1999.

(Continued)

*Primary Examiner*—M. R. Sedighian
*Assistant Examiner*—Dzung D. Tran (57) ABSTRACT

A wavelength division multiplexed (WDM) optical network includes a plurality of optical transmitters, each optical transmitter generating a data signal sent over a respective one of a plurality of signal channels, the plurality of signal channels being divided into a number of sub-bands where each sub-band includes at least two signal channels, and a plurality of substitute signal transmitters, the number of substitute signal transmitters being equal to the number of sub-bands, each substitute signal transmitter generating a substitute signal which provides loading in a corresponding sub-band. The WDM optical network also includes a combining circuit which combines the data signals output from the plurality of optical transmitters and the substitute signals output from the plurality of substitute signal transmitters into a WDM signal, and an optical transmission fiber which receives the WDM signal from the combining circuit.

38 Claims, 11 Drawing Sheets

U.S. PATENT DOCUMENTS

| | | | |
|---|---|---|---|
| 5,841,557 A | * 11/1998 | Otsuka et al. | ................ 398/65 |
| 5,857,043 A | 1/1999 | Cook et al. | |
| 5,861,981 A | 1/1999 | Jabr | |
| 5,864,414 A | 1/1999 | Barnsley et al. | |
| 5,870,217 A | 2/1999 | Itou et al. | |
| 5,872,649 A | 2/1999 | Bryon et al. | |
| 5,900,968 A | 5/1999 | Srivastava et al. | |
| 5,900,969 A | 5/1999 | Srivastava et al. | |
| 5,907,420 A | 5/1999 | Chraplyvy et al. | |
| 5,907,429 A | 5/1999 | Sugata | |
| 5,914,794 A | 6/1999 | Fee et al. | |
| 5,923,453 A | 7/1999 | Yoneyama | |
| 5,926,304 A | 7/1999 | Tajima | |
| 5,940,209 A | 8/1999 | Nguyen | |
| 5,986,800 A | 11/1999 | Kosaka | |
| 6,038,062 A | 3/2000 | Kosaka | |
| 6,172,782 B1 | * 1/2001 | Kobayashi | ..................... 398/9 |
| 6,252,699 B1 | 6/2001 | Kohn | |
| 6,317,255 B1 | 11/2001 | Fatehi et al. | |
| 6,602,002 B1 | * 8/2003 | Srivastava et al. | .......... 398/113 |
| 6,731,877 B1 | * 5/2004 | Cao | ............................ 398/91 |
| 2001/0015836 A1 | * 8/2001 | Kim et al. | ................... 359/124 |

OTHER PUBLICATIONS

Daniel T. Van Atta et al., AT&T Technical Journal, Jan./Feb. 1995, vol. 74, No. 1.

Na, K.W., et al., Rate equation model for gain–clamped erbium–doped fibre amplifiers, $15^{th}$ Apr. 1999, vol. 35, No. 8, p. 663, Electronics Letters.

Kishi, Naoto and Yazaki, Tomonori; Frequency Control of a Single–Frequency Fiber Laser by Cooperatively Induced Spatial–Hole Burning, Feb. 1999, vol. 11, No. 2, p. 182, IEEE Photonics Technology Letters.

Desurvire, E., et al., Dynamic Gain Compensation in Saturated Erbium–Doped Fiber Amplifiers, May 1991, vol. 3, No. 5, pp. 453–455, IEEE Photonics Technology Letters.

Ellis, A.D., et al., Automatic Gain Control in Cascaded Erbium Doped Fibre Amplifier Systems, Jan. 31, 1991, vol. 27, No. 3, pp. 193–95, Electronic Letters.

Zirngibl, M., Gain Control in Erbium–Doped Fibre Amplifiers by an All–Optical Feedback Loop, Mar. 28, 1991, vol. 27, No. 7, pp. 560–561, Electronic Letters.

Luo, G., et al., Relaxation Oscillations and Spectral Hole Burning in Laser Automatic Gain Control of EDFAs, 1997, p. 130, OFC '97 Technical Digest.

Zyskind, J.L., et al., Fast Power Transients in Optically Amplified Multi–wavelength Optical Networks, Feb. 29, 1996, Optical Fiber Communication Post–Deadline Paper 1996, p. PD 31.

Takushima, Yuichi, et al., Gain Spectrum Equalization of All–Optical Gain–Clamped Erbium–Doped Fiber Amplifier, Feb. 1999, vol. 11, No. 2, pp. 176–178, IEEE Photonics Technology Letters.

Srivastava, A.K., et al., Fast–Link Control Protection of Surviving Channels in Multiwavelength Optical Networks, Dec. 1997, vol. 9, No. 12, pp. 1667–1669, IEEE Photonics Technology Letters.

Zyskind, J.L., et al., Fast Link Control Protection for Surviving Channels in Multiwavelength Optical Networks, 1996, pp 5.49–5.52, $22^{nd}$ European Conference on Optical Communications, ECOC '96 Oslo.

Jackel, Janet Lehr, et al., All–Optical Stabilization of Cascaded Multichannel Erbium–Doped Fiber Amplifiers with Changing Numbers of Channels, 1997, pp. 84–85, OFC '97 Technical Digest.

Kashyap, R., et al., Wavelength Flattened Saturated Erbium Amplifier Using Multiple Side Tap Bragg Gratings, $27^{th}$ May 1993, vol. 29, No. 11, pp. 1025–1026, Electronic Letters.

Massicott, J.F., et al., 1480nm Pumped Erbium Doped Fibre Amplifier with All Optical Automatic Gain Control, $9^{th}$ Jun. 1994, vol. 30, No. 12, pp. 962–964, Electronics Letter.

Delevaque, E., et al., Gain Control in Erbium–doped fibre amplifiers by lasing at 1480nm with photoinduced Bragg Gratings written on Fibre Ends, $10^{th}$ Jun. 1993, vol. 29, No. 12, pp. 1112–1114, Electronic Letters.

* cited by examiner

TERMINALS HAVING SUB-BAND SUBSTITUTE SIGNAL CONTROL IN OPTICAL COMMUNICATION SYSTEMS

FIELD OF THE INVENTION

The present invention relates generally to optical communications, and more particularly to a system for maintaining amplifier saturation in a wavelength division multiplexed (WDM) optical communication system.

BACKGROUND OF THE INVENTION

In a dense wavelength division multiplexed (DWDM) system having a high number of signal channels, the initially deployed system typically does not have all of the signal channels fully populated. The number of signal channels that are populated depends upon several factors including the amount of capacity initially required in the DWDM system. To make the amplifiers in the system operational during the lifetime of the system, from initial deployment at less than capacity to full capacity after upgrades, a substitute signal may be used to fill one or more empty channels to maintain the saturation (and other) performance characteristics of the amplifier. In conventional narrowband Erbium doped fiber amplifier DWDM systems, it is theoretically possible for as few as one substitute signal to be used to saturate the amplifier, depending on the operational bandwidth of the substitute signal, although commercial applications employ a substitute signal for each channel.

Raman amplified systems use numerous pump wavelengths to achieve a much larger operational bandwidth than an Erbium doped fiber amplified system. The saturation mechanism for the Raman amplifier is the depletion of the individual pumps. This depletion occurs through pump-pump and pump-signal interactions. As a result, a more delicate balance of substitute signals is used to maintain the system performance of the Raman amplifier. In conventional Raman-amplified systems, a substitute signal is used for each unused signal channel.

As capacity demands continue to grow, efforts are focusing on increasing the usable bandwidth in both EDFA and Raman optical communication systems. As the number of channels increases, the cost associated with providing a substitute signal laser for each channel rises in tandem. Accordingly, it would be desirable to provide systems and methods for maintaining amplifier saturation (and system performance) at reasonable prices as the available bandwidth increases.

SUMMARY OF THE INVENTION

Briefly, in one aspect of the invention, a wavelength division multiplexed (WDM) optical network includes a plurality of optical transmitters, each optical transmitter generating a data signal sent over a respective one of a plurality of signal channels, the plurality of signal channels being divided into a number of sub-bands where each sub-band includes at least two signal channels, and a plurality of substitute signal transmitters, the number of substitute signal transmitters being equal to the number of sub-bands, each substitute signal transmitter generating a substitute signal which provides loading in a corresponding sub-band. The WDM optical network also includes a combining circuit which combines the data signals output from the plurality of optical transmitters and the substitute signals output from the plurality of substitute signal transmitters into a WDM signal, and an optical transmission fiber which receives the WDM signal from the combining circuit.

In another aspect of the invention, a WDM optical network includes a monitoring circuit which detects the wavelengths and power levels of each data signal in the WDM signal.

In yet another aspect of the invention, a WDM optical network includes a control circuit, coupled to the monitoring circuit, which determines if a signal channel is unused or inoperable based on the detected wavelengths and power levels of the data signals detected by the monitoring circuit.

In a further aspect of the invention, the control circuit controls each of the plurality of substitute signal transmitters to be inoperative if all of the signal channels are receiving data signals from the plurality of optical transmitters.

BRIEF DESCRIPTION OF THE DRAWINGS

FIGS. 7(a)–10(b) are graphs which depict transmitted and received signals for various combinations of data signals and substitute signals according to the exemplary embodiment of the present invention.

DETAILED DESCRIPTION OF THE PREFERRED EMBODIMENT

Figure 1A:
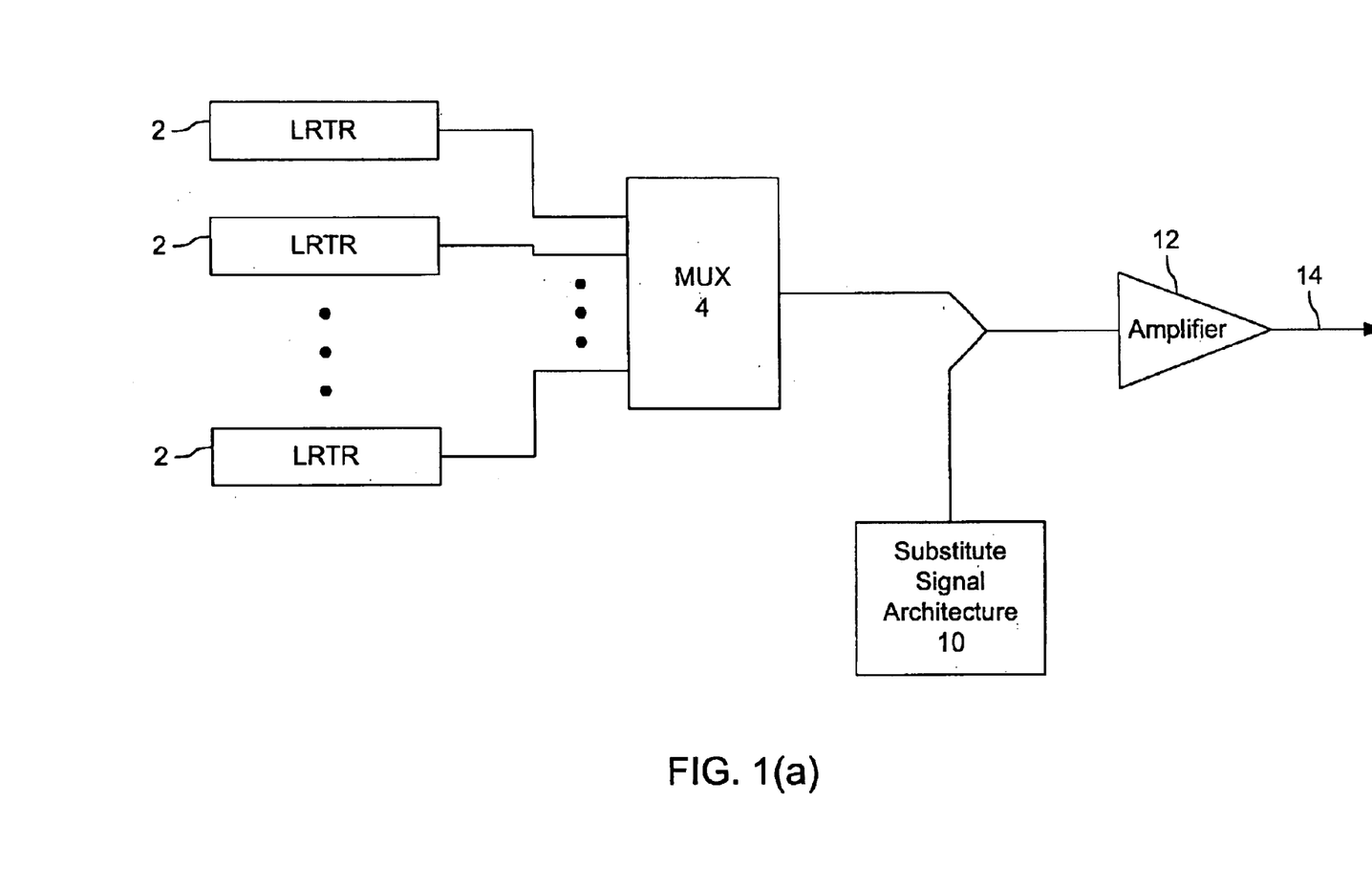
FIG. 1(a) is a block diagram of an exemplary terminal unit consistent with the present invention.

FIG. 1(a) is a block diagram of the transmit portion of a terminal unit including substitute signal architectures consistent with the present invention. Therein, a plurality of long reach transceivers (LRTRs) 2 each generate the optically modulated data signals to be transmitted by the terminal unit. These wavelength channels are wavelength division multiplexed by unit 4 to form a composite signal. Substitute signals are coupled to the multiplexed signal from substitute signal architecture 10, prior to being amplified for transmission by amplifier 12 and transmitted over, e.g., submarine or terrestrial cable 14. Those skilled in the art will appreciate that the multiplexing of data signals can be performed in stages if desired prior to adding the substitute signals.

Figure 1B:
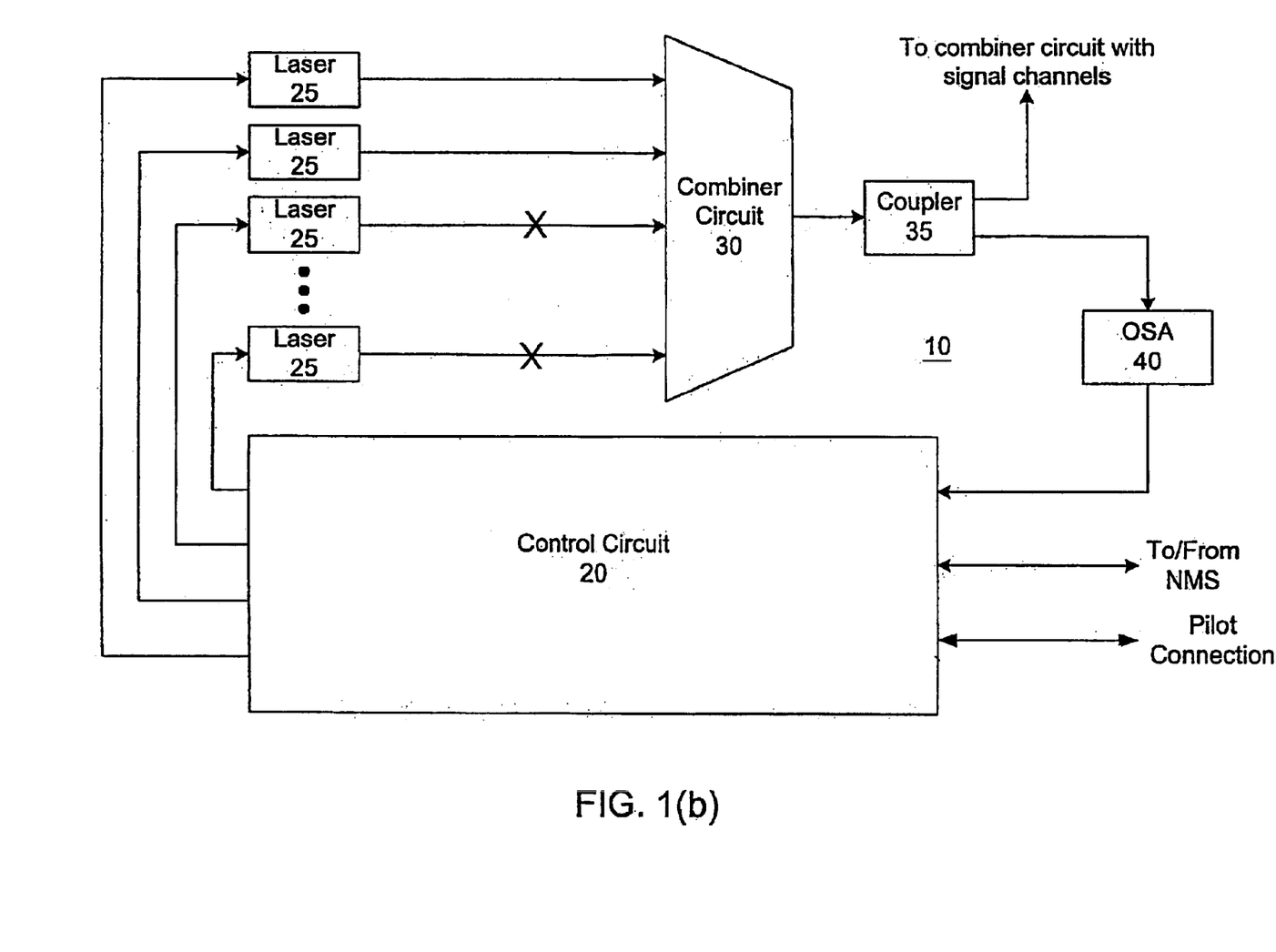
FIG. 1(b) is a block diagram of a substitute signal architecture consistent with the present invention.

FIG. 1(b) is a block diagram of a substitute signal architecture 10 consistent with the present invention. The substitute signal architecture 10 is preferably implemented in a DWDM optical network. As shown in FIG. 1, a substitute signal architecture 10 includes a control circuit 20, a plurality of lasers 25, a combining circuit 30, a coupler 35 and an optical signal analyzer (OSA) 40. The control circuit 20 is coupled to the OSA 40 and receives signals from the OSA 40. The control circuit 20 also receives and sends signals and commands to and from a network management system (NMS) and to and from a pilot connection. The pilot connection can couple a device, such as a laptop computer, to the control circuit 20 to perform various functions for the substitute signal architecture 10, including calibrating components in the system and upgrading software.

The control circuit 20 is coupled to each of the lasers 25 by a control line. The control circuit 20 controls the operation of each of the lasers 25 based upon the received signals and commands from the OSA 40, NMS and pilot connection. The operational control provided by the control circuit 20 includes, for example, turning the lasers 25 on and off, controlling the power levels of the lasers 25, maintaining the wavelength of the signals output from the lasers 25 at a particular setting, and driving the modulation of the signals output from the lasers 25.

The control circuit 20 preferably includes a number of components to perform the operation control functions of the substitute signal architecture 10. These components include, for example, a microprocessor or CPU, a memory, such as a RAM or ROM, a network and pilot port interface, a modulation control circuit, a power control circuit, and a temperature control circuit. The microprocessor executes software or firmware in the memory to control the operation of the modulation, power and temperature control circuits based on the received signals and commands from the OSA 40, NMS and pilot connection. The modulation, power and temperature control circuits generate control signals output on the control lines to control the operation of the lasers 25.

The lasers 25 receive control signals over the control lines from the control circuit 20, and output a substitute signal at a particular wavelength. The lasers 25 may be implemented as Fabry-Perot lasers, distributed feedback lasers, directly modulated signal lasers or spectrally sliced ASE sources. Each laser 25 outputs a substitute signal at a different wavelength. The difference in wavelength output from each laser 25 may be approximately constant, i.e., there is an approximately constant step between wavelengths of the lasers 25. Although only the lasers 25 are shown in FIG. 1, each laser 25 is part of a substitute signal transmitter. Each substitute signal transmitter comprises a respective one of the lasers 25, as well as other circuitry for controlling the operation and modulation of the laser 25.

The modulation of each laser 25 can be controlled by a laser driver, such as an ILX laser driver. Modulation of the substitute signals is provided primarily to avoid stimulated Brillouin scattering effects, but can also be used for signaling purposes. The laser driver may, for example, have a current modulation capability of up to 100 MHz, and more preferably between 1 and 20 MHz, and preferably has a modulation depth of about 0 to 50%. Modulation frequencies may be chosen or formatted to avoid significant intermodulation signals within the information bandwidth. The data modulated onto the signal output from the laser 25 may be a random pseudo code, a sine wave or a square wave. The laser driver may also include a temperature control, such as a thermoelectric cooling (TEC) circuit, and a back facet current monitoring circuit to control the power of the laser 25, as well as a feedback control circuit to control the power of the laser 25.

The number of lasers 25 used in the substitute signal architecture 10 may vary depending upon, for example, the bandwidth of the DWDM optical network and the number of signal channels. For example, for an optical network with a 100 nm bandwidth having between 256 and 384 signal channels, the number of lasers 25 may be 32 or 48. Each laser corresponds to a particular sub-band of the operational bandwidth of the optical network. For example, for 256 signal channels and 32 lasers, each sub-band would include 8 contiguous signal channels, and for 384 signal channels and 32 lasers, each sub-band would include 12 contiguous signal channels. Those skilled in the art will appreciate that systems according to the present invention may have fewer than 256 channels, e.g., 128 channels. The wavelength output from each substitute signal laser 25 may be approximately halfway between the shortest and longest wavelength of the signal channel in the associated sub-band.

Table I below shows an example of possible frequencies and corresponding wavelengths for a 32 laser substitute signal implementation.

TABLE I

| Laser Number | Frequency (GHz) | Wavelength (nm) |
|---|---|---|
| 1 | 196.95 | 1522.15 |
| 2 | 196.55 | 1525.13 |
| 3 | 196.15 | 1528.37 |
| 4 | 195.75 | 1531.51 |
| 5 | 195.35 | 1534.64 |
| 6 | 194.95 | 1537.79 |
| 7 | 194.55 | 1540.95 |
| 8 | 194.15 | 1544.13 |
| 9 | 193.75 | 1547.32 |
| 10 | 193.35 | 1550.52 |
| 11 | 192.95 | 1553.73 |
| 12 | 192.55 | 1556.96 |
| 13 | 192.15 | 1560.20 |
| 14 | 191.75 | 1563.45 |
| 15 | 191.35 | 1566.72 |
| 16 | 190.95 | 1570.00 |
| 17 | 190.55 | 1573.30 |
| 18 | 190.15 | 1576.61 |
| 19 | 189.75 | 1579.93 |
| 20 | 189.35 | 1583.27 |
| 21 | 188.95 | 1586.62 |
| 22 | 188.55 | 1589.98 |
| 23 | 188.15 | 1593.37 |
| 24 | 187.75 | 1596.76 |
| 25 | 187.35 | 1600.17 |
| 26 | 186.95 | 1603.59 |
| 27 | 186.55 | 1607.03 |
| 28 | 186.15 | 1610.39 |
| 29 | 185.75 | 1613.91 |
| 30 | 185.35 | 1617.45 |
| 31 | 184.95 | 1620.86 |
| 32 | 184.55 | 1624.44 |

The substitute signals output from the lasers 25 are combined by the combining circuit 30 into a multiplexed substitute signal. Combining circuit 30 can, for example, be implemented as a single unit, e.g., an arrayed waveguide (AWG). Various types of optical combining components may be used in the combining circuit 30 to generate the multiplexed substitute signal. The optical combining components may be any one or combination of 2×2couplers, 4×4 couplers, wavelength combiners, arrayed waveguides (AWGs), WDM MUXs, or wavelength interleavers. In particular, the use of multiple components for combining circuit 30 may be useful if the bandwidth associated with the substitute signal lasers 25 exceeds the bandwidth of available (or commercially feasible) individual components.

Figure 2:
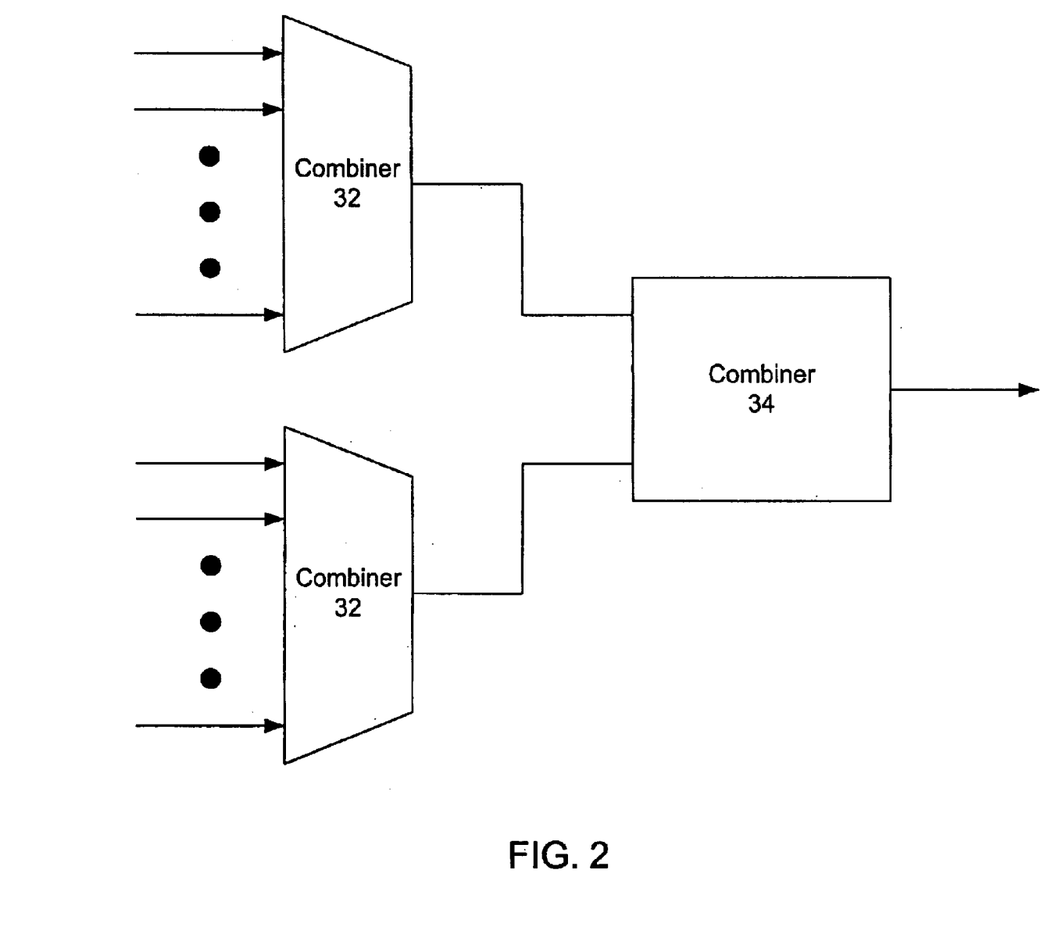
FIG. 2 is a block diagram of a combining circuit consistent with the present invention.

FIG. 2 is an example of an implementation of the combining circuit 30 of the substitute signal architecture 10 consistent with the present invention. As shown in FIG. 2, the combining circuit 30 includes two stages of combining. A first stage includes two combiners 32, and a second stage includes a single combiner 34. In one aspect of the present invention, the combiners 32 may be implemented as AWGs. For an implementation of the substitute signal architecture 10 with 32 substitute signals, each AWG receives and combines 16 substitute signals. The substitute signals received by one of the AWGs may be in the C-band, while the substitute signals received by the other AWG may be in the L-band. The insertion loss for each AWG is preferably less than 5 dB.

The combiner 34 is coupled to receive the combined signals output from the combiners 32. In one aspect of the present invention, the combiner 34 may be implemented as an interleaver or 2×2 coupler. Given the wide bandwidth of commercially available interleavers, the use of an interleaver as a second stage combiner, rather than as a mechanism for interspersing even and odd channels, may be useful. The output of the combiner 34 corresponds to the multiplexed substitute signal. The insertion loss for the interleaver is preferably less than 2 dB. Although not shown in FIG. 2, an amplifier may be included in the combining circuit 30 to compensate for any loss in signal power of the multiplexed substitute signal.

The multiplexed substitute signal output from the combining circuit 30 is provided to a coupler 35. The coupler 35 may be implemented as a 1% coupler, such that 99% of the multiplexed substitute signal is provided to a combining circuit that combines the multiplexed substitute signal with the signal channels of the DWDM optical network and 1% of the multiplexed substitute signal is provided to the OSA 40. The OSA 40 measures the wavelength and peak power of each substitute signal of the multiplexed substitute signal. These measurements are provided to the control circuit 20.

The substitute load architecture 10 provides loading of sub-bands that have unused or failed signal channels. This loading of sub-bands is typically used when the DWDM optical network is first implemented, when the optical network is upgraded to add bandwidth or additional signal channels, and when there are any signal channel failures. The substitute load architecture uses the signals and commands from the OSA 40, the NMS and the pilot connection to establish which substitute signals are needed to load a sub-band, as well as to maintain the proper operation of each laser 25 providing the substitute signal.

Figure 3:
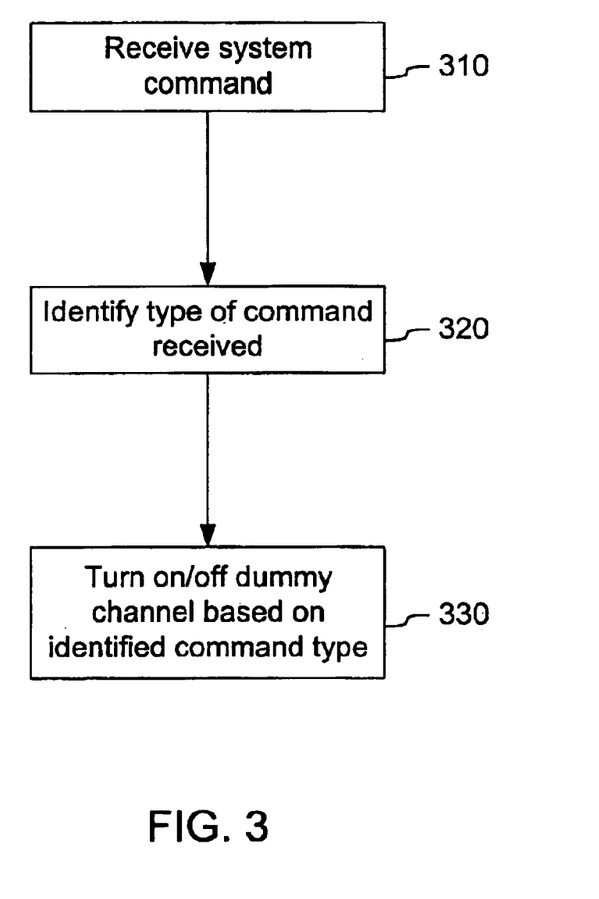
FIG. 3 is a flow diagram for processing a system command in the architecture of FIG. 1.

FIG. 3 is a flow diagram for processing a system command in the substitute signal architecture 10, consistent with the present invention. As shown in FIG. 1, a system command is received by the substitute signal architecture 10 (step 310). The system command may be provided by the NMS or through the pilot connection. For example, in response to detecting the failure of one or more signal channels or detecting that one or more signal channels are unused, the NMS may send a system command to the control circuit 20 instructing the control circuit 20 to turn on the lasers 25 generating the substitute signals corresponding to the sub-bands having the unused or failed signal channels. Alternatively, the NMS may send a system command instructing the control circuit 20 to turn off a laser 25 corresponding to a sub-band that is "being lighted," i.e., the unused signal channels of the sub-band are becoming used.

After receiving the system command, the control circuit 20 identifies the type of command (step 320). As described above, the system command may be to turn on or turn off one or more substitute signals depending upon conditions of the signal channels and associated sub-bands. Other system commands may also be received, such as requests for power and wavelength measurements of the substitute signals.

Based on the identified system command, the control circuit 20 either turns on or turns off one or more of the substitute signals (step 330). The system command can be processed by a microprocessor or CPU in the control circuit 20, which executes software or firmware resident in a memory of the control circuit 20. If the system command is to turn on a substitute signal, the control circuit 20 identifies the laser 25 corresponding to the substitute signal and provides a control signal over a control line to the laser 25 to turn on the laser 25. The control circuit 20 also provides a control signal to the laser to control the power level of the signal output from the laser 25. The control signals may be received and effected by the laser driver of the substitute signal transmitter. If the system command is to turn off a substitute signal, the control circuit 20 identifies the laser 25 corresponding to the substitute signal and provides a control signal over a control line to the laser 25 to turn off the laser 25.

Figure 4:
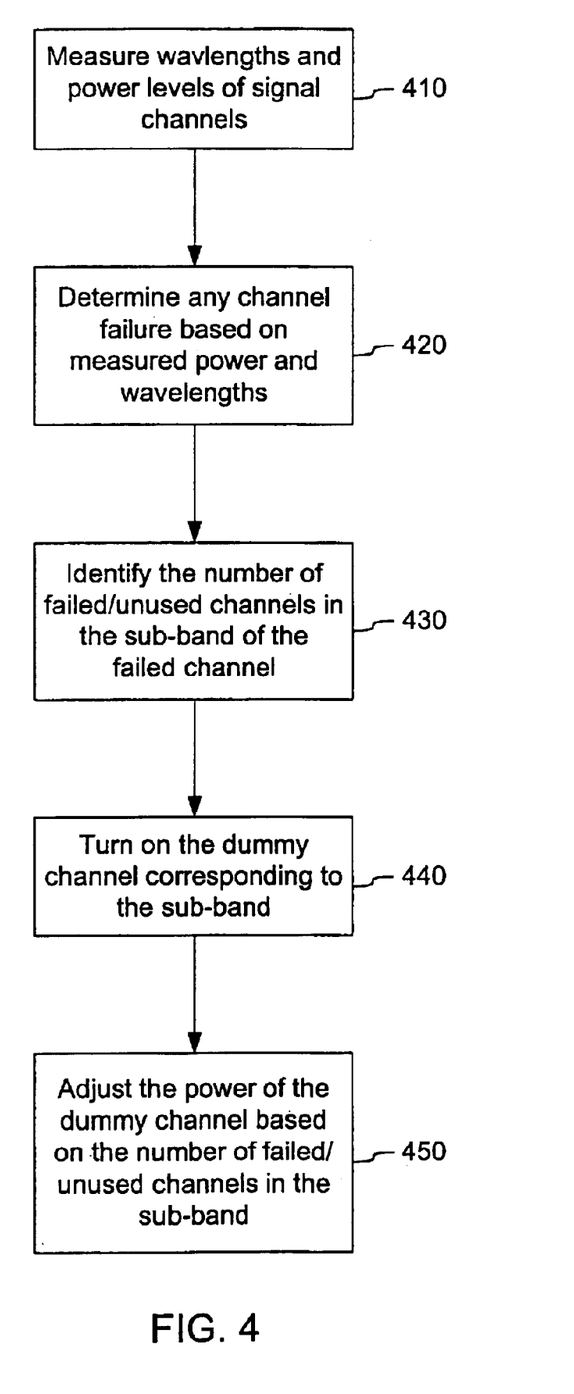
FIG. 4 is a flow diagram for identifying and compensating for failed signal channels in the architecture of FIG. 1.

In addition to receiving system commands, such as from the NMS, to control the operation of the lasers 25 of the substitute signal transmitters, the substitute signal architecture 10 may also turn on or turn off substitute signals based on measured power and wavelengths of the signal channels. FIG. 4 is a flow diagram for identifying and compensating for failed signal channels in the architecture of FIG. 1. As shown in FIG. 4, the wavelengths and power levels of each of the signal channels are measured (step 410). These measurements can be made by the OSA 40, which receives a portion of the signal channels from a coupler, such as a 1% coupler, not shown in FIG. 1. Alternatively, an OSA independent of OSA 40, or another type of optical signal measuring device, may be provided in the optical network to measure the power and wavelengths of the signal channels. The measurements are provided to the control circuit 20 via a signal line between the OSA 40 and the control circuit 20. Alternatively, the measurements may be provided to the NMS from a measuring device in the optical network, and the NMS then provides the measurement information to the control circuit 20.

Based on the measured power and wavelengths of the signal channels, it is determined whether any signal channel has failed (step 420). Using the measurements, the control circuit 20 can determine if the signal power for a particular wavelength is below a threshold indicating that the signal channel has failed. The measurement information is processed by the microprocessor or CPU in the control circuit 20 using software or firmware stored in a memory of the control circuit 20 to determine any signal channel failures.

In addition to determining which signal channels have failed, the number of failed or unused signal channels in the sub-band of the failed signal channels is also identified (step 430). For example, if each sub-band has eight signal channels, then the number of failed or unused signal channels in a particular sub-band may be between one and eight.

For each signal channel determined to have failed, the substitute signal is turned on that corresponds to the sub-band of the failing signal channel (step 440). The control circuit 20 generates a control signal based on the measurements and resulting determinations and provides the control signal to the appropriate substitute signal transmitter to turn on the laser 25 for the substitute signal. In some circumstances, the substitute signal may not be turned on if only a few of the signal channels in the sub-band have failed. For example, if two or fewer signal channels have failed, the still operable signal channels may provide enough loading to obviate the need for the loading provided by the substitute signal. The processing in the control circuit 20 can compare the identified number of failed or unused signal channels in the sub-band to a threshold, and turn on the substitute signal for the sub-band only if the number exceeds the threshold. The value of the threshold may vary depending upon the number of signal channels in a sub-band and based on testing of loading conditions for a reduced number of operable signal channels.

The power of the turned-on substitute signal is adjusted based on the identified number of failed or unused channels in the sub-band (step 450). If there are still operable signal channels in the sub-band, then the signal power of the substitute signal does not need to be as high as when all of the signal channels in the sub-band have failed or are unused. The control circuit 20 can adjust the signal power of the substitute signal to be equal to, less than or greater than the aggregate amount of signal power corresponding to the failed or unused signal channels in the sub-band. If all of the signal channels are unused or have failed, the signal power of the substitute signal can be set to be equal to, less than or greater than the total power of the signal channels in the sub-band. The setting of the signal power of the substitute signal that is used may vary according to the optimum performance of the optical network as determined by the performance for various combinations of failed and/or unused signal channels. The optimum performance may be determined through simulations or testing of the network.

Figure 5:
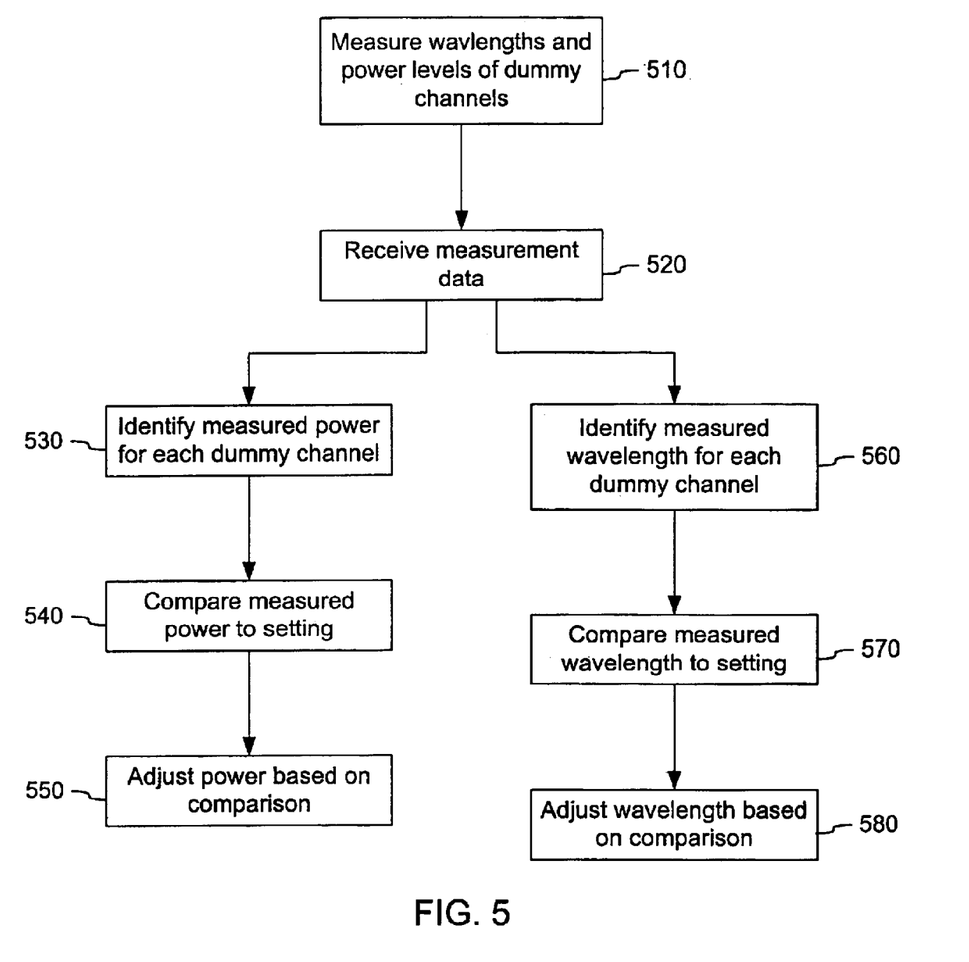
FIG. 5 is a flow diagram for compensating for power and wavelength drift in the architecture of FIG. 1.

When any of the substitute signals are in operation, the substitute signal architecture 10 can monitor and adjust the operation of the substitute signals to maintain the proper loading of the optical network. FIG. 5 is a flow diagram for compensating for power and wavelength drift in the substitute signal architecture 10 consistent with the present invention. As shown in FIG. 5, the wavelengths and power levels of each of the substitute signals are measured (step 510). These measurements are preferably made by the OSA 40, which receives a portion of the substitute signals from the coupler 35 shown in FIG. 1.

The measurements of the wavelengths and power levels of the substitute signals are then received by the control circuit 20 (step 520). The measurements are received via a signal line between the OSA 40 and the control circuit 20. Alternatively, the measurements may be provided to the NMS from a measuring device in the optical network, and the NMS then provides the measurement information to the control circuit 20.

For each substitute signal, the measured power is identified based upon the received measurement data (step 530). The measured power for each substitute signal is then compared to the power setting for the substitute signal (step 540). Based on this comparison, the power for the substitute signal is adjusted (step 550). The power is adjusted if the comparison indicates that there is a power drift. The power drift occurs if the measured power is outside of a tolerance level of the power setting. For example, the tolerance level may be within 1% of the power setting, although other values may be used. If the measured power is outside of the tolerance level, then the control circuit 20 sends a control signal to the substitute signal transmitter of the associated substitute signal to adjust the signal power output from the laser 25 to compensate for the power drift.

Power drift, as well as other factors such as laser case temperature, may affect the wavelength of the substitute signal, resulting in wavelength drift. A process similar to the one described above for compensating for power drift can be applied to compensate for wavelength drift of the substitute signals. As shown in FIG. 5, the measured wavelength for each substitute signal is identified (step 560). The measured wavelength is then compared to the wavelength setting for each substitute signal (step 570). Based upon this comparison, the wavelength of the substitute signal may be adjusted (step 580). The wavelength is adjusted if the comparison indicates that there is a wavelength drift, which occurs if the measured wavelength is outside of a tolerance level of the wavelength setting. For example, the tolerance level may be within 1% of the wavelength setting, although other values may be used. If the measured wavelength is outside of the tolerance level, then the control circuit 20 sends a control signal to the substitute signal transmitter of the associated substitute signal to adjust the wavelength of the signal output from the laser 25 to compensate for the wavelength drift. One way to adjust the wavelength of the signal output from the laser 25 is to adjust the temperature of the laser case. The temperature adjustment can be effected with the temperature control circuitry in the control circuit 20 and the TEC circuit of the laser driver of the substitute signal transmitter.

Figure 6:
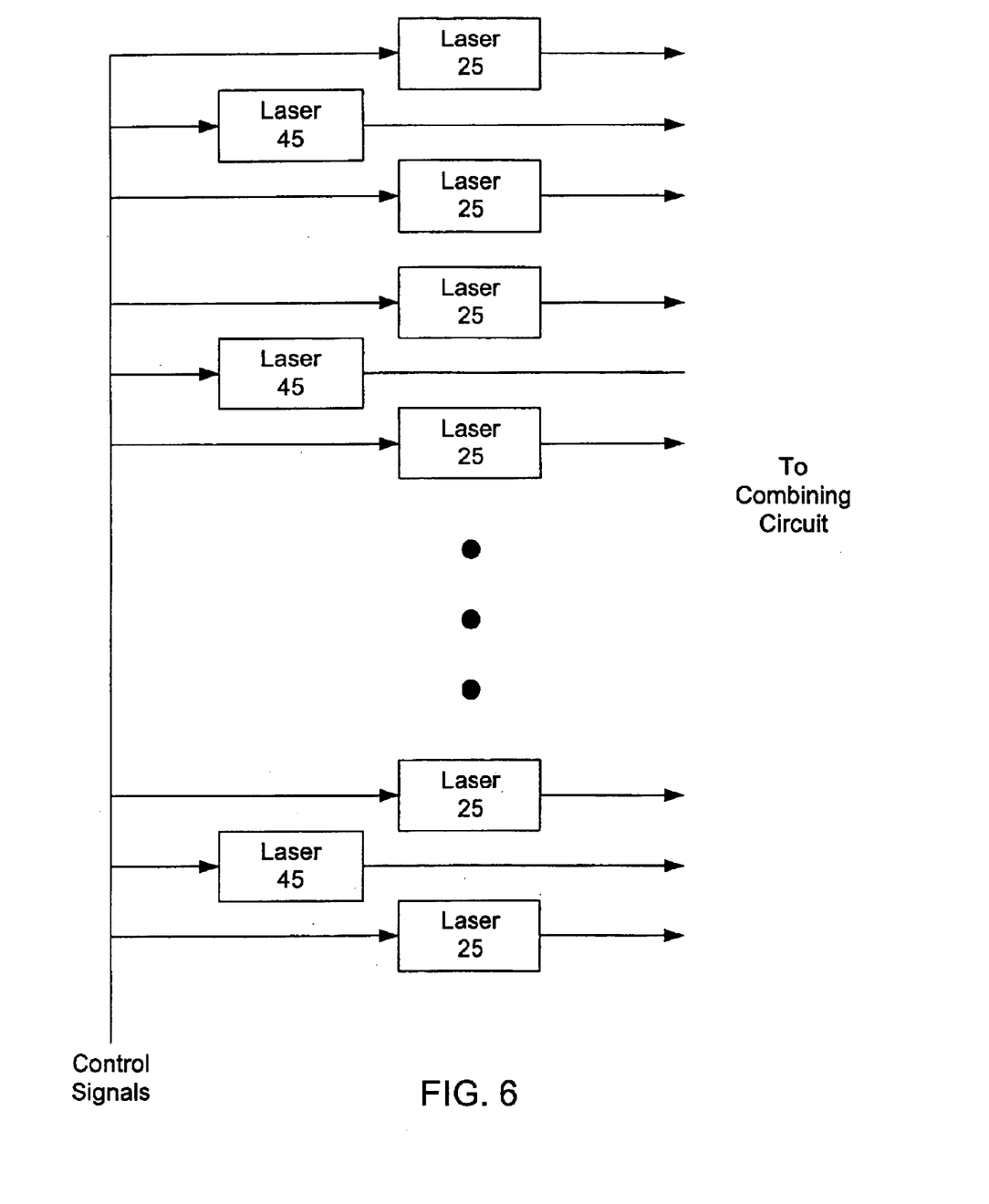
FIG. 6 is a block diagram of a redundancy circuit consistent with the present invention.

As described above, the use of substitute signal transmitters to generate substitute signals can maintain proper loading of an optical network in the event of a failure of a signal channel. The substitute load architecture 10 can also compensate for failures of substitute transmitters. FIG. 6 is a block diagram of a redundancy circuit consistent with the present invention. As shown in FIG. 6, a redundancy circuit includes redundant lasers 45 in addition to the lasers 25 shown in FIG. 1. Although not shown, the redundant lasers 45 may each be a part of a redundant substitute signal transmitter. Alternatively, the redundant lasers 45 may share the substitute transmitter circuitry of the lasers 25.

In the redundancy circuit of FIG. 6, each redundant laser 45 is associated with a respective pair of lasers 25. In other words, each redundant laser 45 is used to compensate for the failure of one or both of the pairs of lasers 25 to which it corresponds. The wavelength of the redundant laser 45 may be approximately halfway in between the wavelength of the pair of lasers 25 to which it corresponds. Although FIG. 6 shows two lasers 25 for each redundant laser 45, other ratios of lasers 25 to redundant lasers 45 may also be used.

The detection of a failure of a laser 25, or more generally, the failure of the substitute signal transmitter of the laser 25 is similar to the detection of the power drift, as described above. Like the detection of the power drift, the power of each substitute signal is measured by the OSA 40 and communicated to the control circuit 20. The control circuit 20 processes the measured power data and evaluates if the substitute signal has failed, such as by comparing the measured power to a threshold, such that if the measured power is below the threshold, the substitute signal is determined to have failed. Based on the detection of the failed substitute signal, the control circuit 20 activates the redundant substitute signal transmitter corresponding to the failed substitute signal and adjusts the power of the redundant substitute transmitter to compensate for the loading lost by the failed substitute signal.

Table II below shows an example of possible frequencies and corresponding wavelengths for a 16 redundant laser implementation for the 32 laser implementation of Table I.

TABLE II

| Redundant Laser Number | Frequency (GHz) | Wavelength (nm) |
| --- | --- | --- |
| 1 | 196.75 | 1523.66 |
| 2 | 195.95 | 1529.94 |
| 3 | 195.15 | 1536.22 |
| 4 | 194.35 | 1542.54 |
| 5 | 193.55 | 1548.91 |
| 6 | 192.75 | 1555.34 |
| 7 | 191.95 | 1561.83 |
| 8 | 191.15 | 1568.36 |
| 9 | 190.35 | 1574.95 |

TABLE II-continued

| Redundant Laser Number | Frequency (GHz) | Wavelength (nm) |
|---|---|---|
| 10 | 189.55 | 1581.60 |
| 11 | 188.75 | 1588.30 |
| 12 | 187.95 | 1595.06 |
| 13 | 187.15 | 1601.88 |
| 14 | 186.35 | 1608.76 |
| 15 | 185.55 | 1615.62 |
| 16 | 184.75 | 1622.57 |

The substitute signal architecture 10 may also be designed to compensate for gain tilt, which can result from the Raman gain effect. Due to the Raman gain effect, shorter wavelengths provide gain to longer wavelengths. With respect to the substitute signals, the substitute signals having the shorter wavelengths can provide gain to the substitute signals having the longer wavelengths, resulting in a gain tilt. To compensate for the gain tilt, an attenuation splice can be inserted between the lasers 25 and the combining circuit 30. The attenuation splice alters the insertion loss, which adjusts for the gain tilt.

Figure 7:
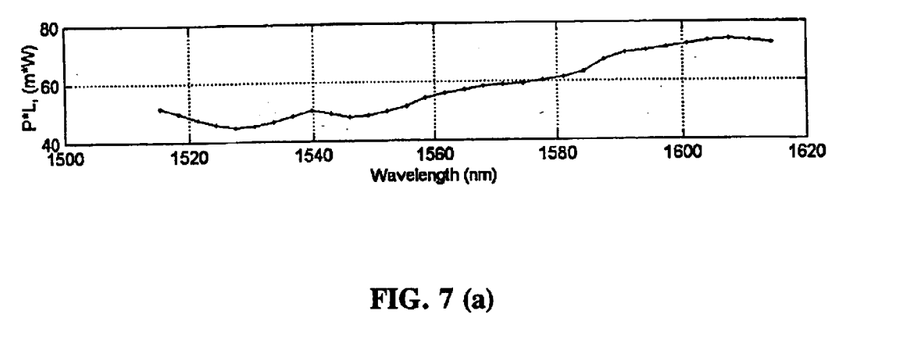
Figure 8:
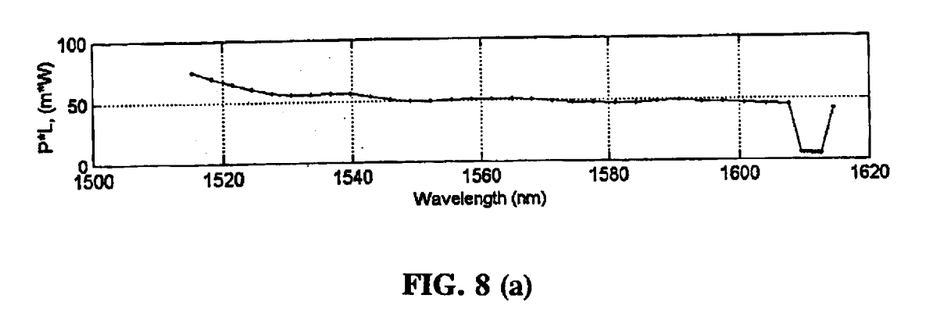
Figure 9:
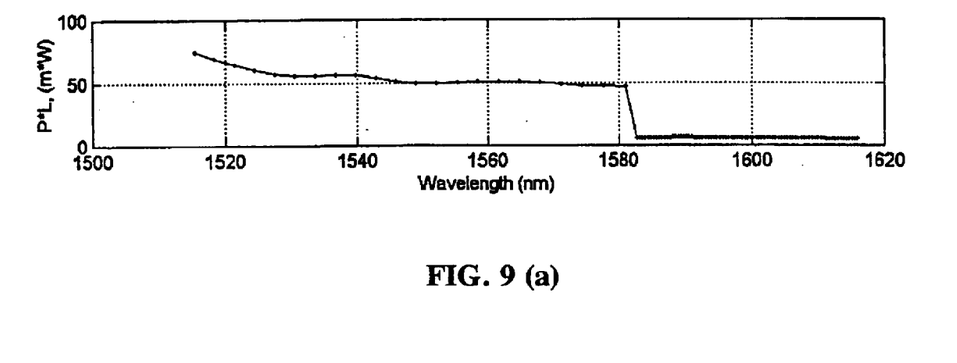
Figure 10:
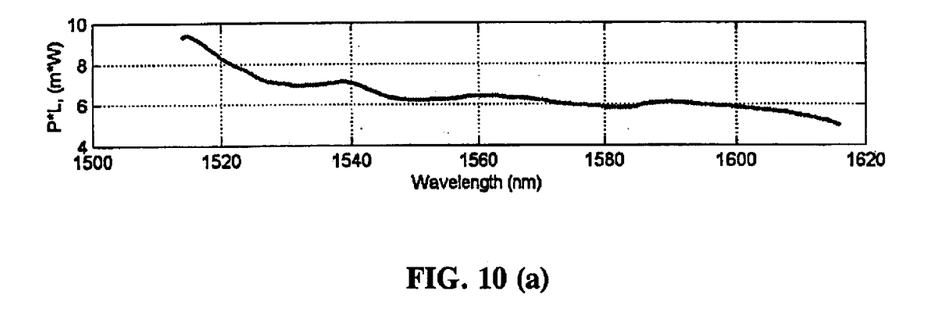

FIGS. 7(a)–10(b) depict simulation results which Applicants have generated to test substitute signal architectures consistent with the present invention. Therein, the ability of the above-described 32 laser substitute signal embodiment to successfully load unused channels in a wideband, Raman amplified optical communication system is confirmed. FIG. 7(a) depicts system launch power as a function of the wavelength spectrum of operation when all of the sub-bands are filled with substitute signals, e.g., at system start up before data channels are turned on. FIG. 7(b) depicts the gain of the simulated received signal as a function of wavelength, which indicates that the substitute signal loading results in relatively little gain excursion, i.e., less than about 1 dB. FIG. 8(a) illustrates a simulation wherein one sub-band is transmitted with 8 data signals, while the rest of the system is still loaded with substitute signals. Note that the data signals are transmitted more closely together at lower power. FIG. 8(b) shows the simulated received signals, which indicate that the received data signals conform nicely with the received substitute signals. These results are confirmed by the simulation illustrated in FIGS. 9(a) and 9(b) which show the transmission of 80 data signals between about 1580 nm and 1620 nm. Lastly, the simulation for a fully populated system (no substitute signals) is provided as FIGS. 10(a) and 10(b).

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications suited to the particular use contemplated. It is intended that the scope of the invention be defined by the claims appended hereto and their equivalents.

For example, the sub-band/signal substitution strategies discussed above may also be used in the context of implementing switches between service fibers and protection fibers. If a problem arises with a particular signal channel, then the system may detect that problem and switch all of the signal channels from the service fiber to the protection fiber. The system turns on the substitute (sometimes referred to as "dummy") signal associated with the switched sub-band for the protection fiber and turns off the substitute signal associated with the switched sub-band for the service fiber.

What is claimed is:

1. A WDM optical network, comprising:

a plurality of optical transmitters, each optical transmitter generating a data signal sent over a respective one of a plurality of signal channels, the plurality of signal channels being divided into a number of sub-bands where each sub-band includes at least two signal channels;

a plurality of substitute signal transmitters, the number of substitute signal transmitters being equal to the number of sub-bands, each substitute signal transmitter generating a substitute signal which provides loading in a corresponding sub-band;

a combining circuit which combines the data signals output from the plurality of optical transmitters and the substitute signals output from the plurality of substitute signal transmitters into a WDM signal, a monitoring circuit which detects the wavelengths and power levels of each data signal in the WDM signal;

a control circuit, coupled to the monitoring circuit, which determines if a signal channel is unused or inoperable based on the detected wavelengths and power levels of the data signals detected by the monitoring circuit, if one or more signal channels is determined to be unused or inoperable, the control circuit identifies the sub-band of the unused or inoperable signal channel and turns on the substitute signal transmitter corresponding to the identified sub-band, wherein the control circuit adjusts the power of the turned-on substitute signal transmitter depending on the number of unused or inoperable signal channels in the identified sub-band; and, an optical transmission fiber which receives the WDM signal from the combining circuit.

2. A WDM optical network according to claim 1, wherein the control circuit determines how many signal channels in each of the sub-bands are unused or inoperable, and turns on a substitute signal transmitter corresponding to a particular sub-band if the number of signal channels in the particular sub-band exceeds a predetermined number.

3. A WDM optical network comprising:

a plurality of optical transmitters, each optical transmitter generating a data signal sent over a respective one of a plurality of signal channels, the plurality of signal channels being divided into a number of sub-bands where each sub-band includes at least two signal channels;

a plurality of substitute signal transmitters, the number of substitute signal transmitters being equal to the number of sub-bands, each substitute signal transmitter generating a substitute signal which provides loading in a corresponding sub-band;

a combining circuit which combines the data signals output from the plurality of optical transmitters and the substitute signals output from the plurality of substitute signal transmitters into a WDM signal;

an optical transmission fiber which receives the WDM signal from the combining circuit; and, a plurality of backup transmitters, the number of backup transmitters being less than the number of substitute signal transmitters.

4. A WDM optical network according to claim 3, further comprising:
   a monitoring circuit which detects the wavelengths and power levels of each data signal in the WDM signal.

5. A WDM optical network according to claim 4, further comprising:
   a control circuit, coupled to the monitoring circuit, which determines if a signal channel is unused or inoperable based on the detected wavelengths and power levels of the data signals detected by the monitoring circuit.

6. A WDM optical network according to claim 5, wherein the control circuit controls each of the plurality of substitute signal transmitters to be inoperative if all of the signal channels are receiving data signals from the plurality of optical transmitters.

7. A WDM optical network according to claim 5, wherein if one or more signal channels is determined to be unused or inoperable, the control circuit identifies the sub-band of the unused or inoperable signal channel and turns on the substitute signal transmitter corresponding to the identified sub-band.

8. A WDM optical network according to claim 3, wherein there is one backup transmitter corresponding to each pair of substitute signal transmitters.

9. A WDM optical network according to claim 8, wherein a control circuit detects a fault in a substitute signal transmitter based on detected wavelengths and power levels of the substitute signals detected by a monitoring circuit, and turns on a backup transmitter corresponding to the substitute signal transmitter in which the fault is detected.

10. A WDM optical network according to claim 9, wherein the control circuit adjusts the power of the backup transmitter based on whether a fault has been detected in one or both of the pair of substitute signal transmitters corresponding to the backup transmitter.

11. A WDM optical network according to claim 3, wherein the number of optical transmitters is at least 128 and the number of sub-bands is no more than 48.

12. The WDM optical network according to claim 11, wherein the number of signal channels within each sub-band is at least 12.

13. A WDM optical network according to claim 3, further comprising:
   a plurality of optical fiber splices, each optical fiber splice coupling a respective one of the plurality of substitute transmitters to the combining circuit.

14. A WDM optical network according to claim 13, wherein each optical fiber splice imposes an amount of insertion loss, which attenuates the power of the substitute signals output from each of the substitute signal transmitters.

15. A WDM optical network according to claim 14, wherein the amount of insertion loss imposed by the optical fiber splices coupled to substitute signal transmitters outputting substitute signals at shorter wavelengths is less than the amount of insertion loss imposed by the optical fiber splices coupled to substitute signal transmitters outputting substitute signals at longer wavelengths.

16. The WDM optical network according to claim 3, wherein a laser is associated with each of said plurality of substitute signal transmitters, said laser having a frequency which is approximately halfway between a shortest frequency and a largest frequency in the corresponding sub-band.

17. A WDM optical network comprising:
   a plurality of optical transmitters, each optical transmitter generating a data signal sent over a respective one of a plurality of signal channels, the plurality of signal channels being divided into a number of sub-bands where each sub-band includes at least two signal channels;
   a plurality of substitute signal transmitters, the number of substitute signal transmitters being equal to the number of sub-bands, each substitute signal transmitter generating a substitute signal which provides loading in a corresponding sub-band;
   a combining circuit which combines the data signals output from the plurality of optical transmitters and the substitute signals output from the plurality of substitute signal transmitters into a WDM signal,
   a monitoring circuit which detects the wavelengths and power levels of each data signal in the WDM signal:
   a control circuit, coupled to the monitoring circuit, which determines if a signal channel is unused or inoperable based on the detected wavelengths and power levels of the data signals detected by the monitoring circuit, wherein the control circuit determines if there is any wavelength drift in the substitute signals output from the substitute signal transmitters based on the detected wavelengths and power levels of the substitute signals detected by the monitoring circuit.

18. A WDM optical network according to claim 17, wherein if a substitute signal transmitter is determined to have wavelength drift, the control circuit adjusts a temperature of the substitute transmitter to compensate for the wavelength drift.

19. A WDM terminal unit, comprising:
   a plurality of optical transmitters, each optical transmitter generating a data signal sent over a respective one of a plurality of signal channels, the plurality of signal channels being divided into a number of sub-bands where each sub-band includes at least two signal channels;
   a plurality of substitute signal transmitters, the number of substitute signal transmitters being equal to the number of sub-bands, each substitute transmitter generating a substitute signal which provides loading in a corresponding sub-band;
   a combining circuit which combines the data signals output from the plurality of optical transmitters and the substitute signals output from the plurality of substitute signal transmitters into a WDM signal;
   a monitoring circuit which detects the wavelengths and power levels of each data signal in the WDM signal; and
   a control circuit, coupled to the monitoring circuit, which determines if a signal channel is unused or inoperable based on the detected wavelengths and power levels of the data signals detected by the monitoring circuit, if one or more signal channels is determined to be unused or inoperable, the control circuit identifies the sub-band of the unused or inoperable signal channel and turns on the substitute signal transmitter corresponding to the identified sub-band, wherein the control circuit adjusts the power of the turned-on substitute signal transmitter depending on the number of unused or inoperable signal channels in the identified sub-band.

20. A WDM terminal unit according to claim 19, wherein the control circuit determines how many signal channels in each of the sub-bands are unused or inoperable, and turns on a substitute signal transmitter corresponding to a particular sub-band if the number of signal channels in the particular sub-band exceeds a predetermined number.

21. A WDM terminal unit, further comprising:
a plurality of optical transmitters, each optical transmitter generating a data signal sent over a respective one of a plurality of signal channels, the plurality of signal channels being divided into a number of sub-bands where each sub-band includes at least two signal channels;
a plurality of substitute signal transmitters, the number of substitute signal transmitters being equal to the number of sub-bands, each substitute transmitter generating a substitute signal which provides loading in a corresponding sub-band;
a combining circuit which combines the data signals output from the plurality of optical transmitters and the substitute signals output from the plurality of substitute signal transmitters into a WDM signal;
a plurality of backup transmitters, the number of backup transmitters being less than the number of substitute transmitters.

22. A WDM terminal unit according to claim 21, further comprising:
a monitoring circuit which detects the wavelengths and power levels of each data signal in the WDM signal.

23. A WDM terminal unit according to claim 22, further comprising:
a control circuit, coupled to the monitoring circuit, which determines if a signal channel is unused or inoperable based on the detected wavelengths and power levels of the data signals detected by the monitoring circuit.

24. A WDM terminal unit according to claim 23, wherein the control circuit controls each of the plurality of substitute signal transmitters to be inoperative if all of the signal channels are receiving data signals from the plurality of optical transmitters.

25. A WDM terminal unit according to claim 23, wherein if one or more signal channels is determined to be unused or inoperable, the control circuit identifies the sub-band of the unused or inoperable signal channel and turns on the substitute signal transmitter corresponding to the identified sub-band.

26. A WDM terminal unit according to claim 21, wherein there is one backup transmitter corresponding to each pair of substitute signal transmitters.

27. A WDM terminal unit according to claim 26, wherein a control circuit detects a fault in a substitute signal transmitter based on detected wavelengths and power levels of the substitute signals detected by a monitoring circuit, and turns on a backup transmitter corresponding to the substitute signal transmitter in which the fault is detected.

28. A WDM terminal unit according to claim 27, wherein the control circuit adjusts the power of the backup transmitter based on whether a fault has been detected in one or both of the pair of substitute signal transmitters corresponding to the backup transmitter.

29. A WDM terminal unit according to claim 21, wherein the number of optical transmitters is at least 128 and the number of sub-bands is no more than 48.

30. The WDM terminal unit according to claim 29, wherein the number of signal channels within each sub-band is at least 12.

31. A WDM terminal unit according to claim 21, further comprising:
a plurality of optical fiber splices, each optical fiber splice coupling a respective one of the plurality of substitute transmitters to the combining circuit.

32. A WDM terminal unit according to claim 31, wherein each optical fiber splice imposes an amount of insertion loss, which attenuates the power of the substitute signals output from each of the substitute signal transmitters.

33. A WDM terminal unit according to claim 32, wherein the amount of insertion loss imposed by the optical fiber splices coupled to substitute signal transmitters outputting substitute signals at shorter wavelengths is less than the amount of insertion loss imposed by the optical fiber splices coupled to substitute signal transmitters outputting substitute signals at longer wavelengths.

34. The WDM terminal unit according to claim 21, wherein a laser is associated with each of said plurality of substitute signal transmitters, said laser having a frequency which is approximately halfway between a shortest frequency and a largest frequency in the corresponding sub-band.

35. The WDM terminal unit according to claim 21, wherein the combining circuit comprises:
a first combiner unit for combining a first plurality of said wavelength channels to generate a first combined set of wavelength channels;
a second combiner unit for combining a second plurality of said wavelength channels which are outside the band of said first plurality to generate a second combined set of wavelength channels; and
an interleaver for receiving and combining said first and second combined sets of wavelength channels to output a third combined set of wavelength channels.

36. The combiner circuit of claim 35, wherein said first and second combining units are arrayed waveguides (AWGs).

37. A WDM terminal unit, comprising;
a plurality of optical transmitters, each optical transmitter generating a data signal sent over a respective one of a plurality of signal channels, the plurality of signal channels being divided into a number of sub-bands where each sub-band includes at least two signal channels;
a plurality of substitute signal transmitters, the number of substitute signal transmitters being equal to the number of sub-bands, each substitute transmitter generating a substitute signal which provides loading in a corresponding sub-band;
a combining circuit which combines the data signals output from the plurality of optical transmitters and the substitute signals output from the plurality of substitute signal transmitters into a WDM signal;
a monitoring circuit which detects the wavelengths and power levels of each data signal in the WDM signal; and,
a control circuit, coupled to the monitoring circuit, which determines if a signal channel is unused or inoperable based on the detected wavelengths and power levels of the data signals detected by the monitoring circuit, wherein the control circuit determines if there is any wavelength drift in the substitute signals output from the substitute signal transmitters based on the detected wavelengths and power levels of the substitute signals detected by the monitoring circuit.

38. A WDM terminal unit according to claim 37, wherein if a substitute signal transmitter is determined to have wavelength drift, the control circuit adjusts a temperature of the substitute signal transmitter to compensate for the wavelength drift.

* * * * *